(12) United States Patent
Maclay et al.

(10) Patent No.: US 10,589,863 B2
(45) Date of Patent: Mar. 17, 2020

(54) APPARATUS AND METHODS TO ATTACH AN OBJECT TO AN OVERHEAD SECTION OF A CABIN OF AN AIRCRAFT

(71) Applicant: The Boeing Company, Chicago, IL (US)

(72) Inventors: William Maclay, Seattle, WA (US); Peter Zarkowskyj, Everett, WA (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 15/589,576

(22) Filed: May 8, 2017

(65) Prior Publication Data

US 2018/0319502 A1 Nov. 8, 2018

(51) Int. Cl.
*B64D 11/00* (2006.01)
(52) U.S. Cl.
CPC ...... *B64D 11/0023* (2013.01); *B64D 11/0015* (2013.01); *B64D 2011/0046* (2013.01)
(58) Field of Classification Search
CPC combination set(s) only.
See application file for complete search history.

(56) References Cited

U.S. PATENT DOCUMENTS

| 6,220,317 | B1 | 4/2001 | Martin et al. | |
| 2008/0264889 | A1 | 10/2008 | Larsen | |
| 2009/0321574 | A1* | 12/2009 | Erickson | B64D 11/0023 244/131 |
| 2012/0234976 | A1* | 9/2012 | Neumann | B61D 17/048 244/131 |
| 2014/0158310 | A1* | 6/2014 | Slyter | B64D 11/0023 160/124 |
| 2016/0167786 | A1* | 6/2016 | Maclay | B64D 11/0023 244/118.5 |
| 2016/0297525 | A1* | 10/2016 | Walton | B64D 11/0023 |

FOREIGN PATENT DOCUMENTS

| EP | 2801523 | 11/2014 |
| EP | 2873882 | 5/2015 |

OTHER PUBLICATIONS

European Patent Office, "Communication pursuant to Article 94(3) EPC," issued in connection with European Patent Application No. 18169922.4, dated Sep. 19, 2019, 5 pages.

(Continued)

*Primary Examiner* — Jessica B Wong
(74) *Attorney, Agent, or Firm* — Hanley, Flight & Zimmerman, LLC

(57) ABSTRACT

Apparatus and methods to attach an object to an overhead section of a cabin of an aircraft. An example apparatus includes a bracket to be positioned between rails in a cabin of an aircraft. The bracket includes edges having first attachment points to align with second attachment points of each of the rails. The bracket is positionable along a length of the rails by aligning the first attachment points of the bracket with a portion of the second attachment points of the rails. The bracket also includes flanges disposed between the edges. The flanges have respective third attachment points and fourth attachment points aligned to receive fasteners for hanging a device used in the cabin of the aircraft.

12 Claims, 11 Drawing Sheets

(56) References Cited

OTHER PUBLICATIONS

Professional Garage Door, "LiftMaster Commercial Trolley Operators", http://www.prodoorsystems.com/trolley-operators/, retrieved on May 4, 2017 (4 pages).
Demag, "KBK double-girder suspension cranes", Terex MHPS GmbH, http://www.demagcranes.de/KBK-light-crane-system/KBK-double-girder-suspension-creans;jsessionid=23F35E3A43E886E372766AED5F2E2423.nodeb, retrieved on May 4, 2017 (3 pages).
Cheesycam, "Dual Rail Video Camera Track Dolly Slider", http://cheesycam.com/dual-rail-video-camera-track-dolly-slider/, Aug. 1, 2012 (10 pages).
European Patent Office, "Extended European Search Report," issued in connection with European Patent Application No. 181699224, dated Jun. 29, 2018, 8 pages.

\* cited by examiner

APPARATUS AND METHODS TO ATTACH AN OBJECT TO AN OVERHEAD SECTION OF A CABIN OF AN AIRCRAFT

FIELD OF THE DISCLOSURE

This disclosure relates generally to brackets and, more particularly, to methods and apparatus to attach an object to an overhead section of a cabin of an aircraft.

BACKGROUND

In cabins of aircraft and other commercial vehicles, cabin dividers may be used to divide different portions of the cabin, such as to divide first class from business class. In some aircraft, the cabin dividers and/or other objects (e.g., screens, signage, projectors, lights, etc.) may be mounted on a ceiling and/or under overhead storage bins.

SUMMARY

An example apparatus includes a bracket to be positioned between rails in a cabin of an aircraft. The bracket includes edges having first attachment points to align with second attachment points of each of the rails. The bracket is positionable along a length of the rails by aligning the first attachment points of the bracket with a portion of the second attachment points of the rails. The bracket also includes flanges disposed between the edges. The flanges have respective third attachment points and fourth attachment points aligned to receive fasteners for hanging a device used in the cabin of the aircraft.

Another example apparatus includes rails positioned in an overhead section in a cabin of an aircraft. A bracket is rigidly coupled between the rails via corresponding attachment points of the rails and the bracket. The bracket is to increase a load capacity of the rails. A cabin divider is to be coupled to flanges of the bracket. The cabin divider is to hang from the bracket in the cabin of the aircraft.

An example method includes aligning first attachment points of a bracket with attachment points of rails disposed in a cabin of an aircraft, coupling the bracket to the rails using clamp plates and fasteners disposed through the first attachment points and a portion of the attachment points of the rails, and coupling a divider to second attachment points of the bracket using fasteners disposed through second attachment points of the bracket and a flange of the divider.

Figure 1:
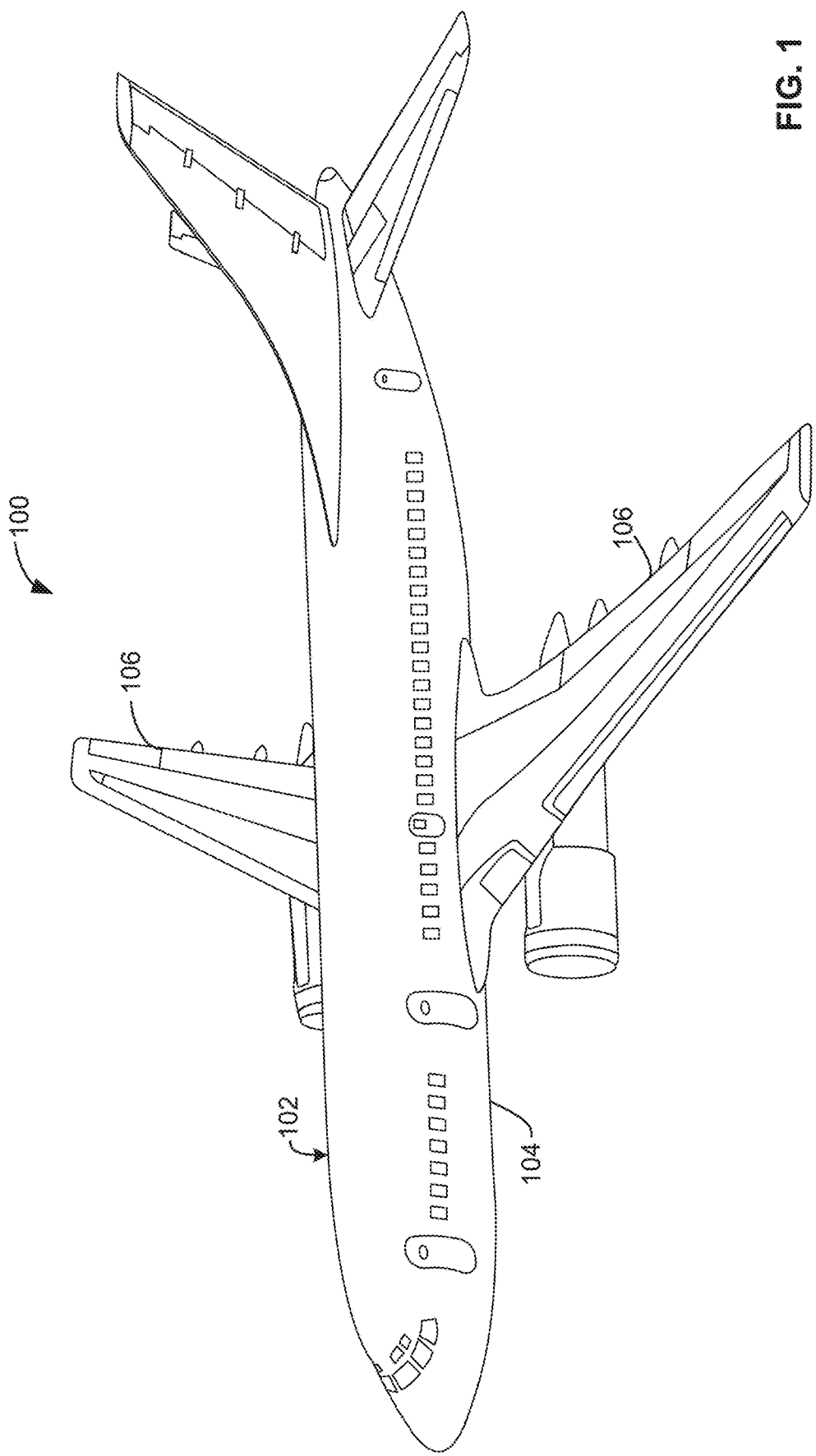
FIG. 1 illustrates an aircraft including a cabin within which an example apparatus described herein may be implemented.

The figures are not to scale. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Cabin dividers may be installed in cabins of aircraft to divide portions of the cabin (e.g., first class, business class, economy class, etc.). Cabin dividers and other objects may be hung from an overhead section below overhead storage bins and above passenger seating. In some current example apparatus for hanging cabin dividers, the installation process must be completed during the initial manufacture of the aircraft and/or installation of the cabin features (e.g., passenger seating, passenger service units, etc.). Additionally, some such cabin dividers or other objects mounted above the passenger seats may be mounted such that a point load is placed on the rails and/or the objects mounted to the rails and causes deflection of a support structure of the overhead section, such as rails and other underlying structure. To control and/or reduce an amount of deflection of the rails and other underlying structure when hanging some current cabin dividers or other objects, installation of specialized tracks and/or specialized underlying support structures is needed. In some cases, installing specialized support structure requires costly research and testing to ensure the structure is sufficient to support the weight of the objects that are to be installed. It may not be possible to implement such specialized rails or specialized underlying support structures with existing rails or underlying support structure and, thus, complete removal and/or modification of the existing rails or support structure may be required. Additionally or alternatively, it may not be possible to retrofit such specialized rails or specialized underlying support structure in some aircraft.

The example apparatus described herein provide for installation of cabin dividers or other objects (e.g., screens, signage, projectors, lights, medical supplies, etc.) without requiring specialized rails or underlying support structure. Additionally, when using the example apparatus described herein, the cabin dividers and other objects will control or reduce deflection (e.g., twisting deflection, lateral deflection, vertical deflection, etc.) of the existing rails and underlying support structure. Instead, the example apparatus described herein can increase a load capacity of the existing structure. Thus, in addition to being used in new aircraft, the example cabin dividers can be retrofit to existing aircraft. The example cabin dividers can be positioned in many locations in overhead sections of aircraft. The position of the cabin dividers or other objects may be determined based on, for example, an arrangement of the passenger seats.

An example apparatus in accordance with the examples described herein includes a bracket positioned between existing rails in a cabin of an aircraft. The example bracket can be attached to the existing rails located in the overhead section under the storage bins of the cabin. The example apparatus may be implemented with central overhead sections and/or with outboard overhead sections. The bracket includes edges having apertures to be aligned with apertures of each of the rails. The bracket is positionable along a length of the rails by aligning the apertures of the bracket with a portion of the apertures of the rails. The bracket also includes flanges disposed between the edges. The example flanges have apertures to receive fasteners for hanging a device (e.g., a cabin divider, a screen, a sign, a projector, a light, medical supplies, etc.) in the cabin of the aircraft.

In some examples, the bracket may include support ribs disposed between the edges of the bracket and the flanges of the bracket. The example bracket may also include one or more cutouts disposed adjacent the ribs and/or the flanges to reduce a weight of the bracket. Additional flanges may be disposed adjacent the first flanges of the bracket. Each of the flanges of the example bracket includes corresponding apertures to receive the fasteners for hanging the device. In some examples, the additional flanges are positioned between the respective first flanges and the edges of the bracket. In the examples described herein, a distance between respective ones of the first flanges and the second flanges is less than a distance between the first flanges.

The example bracket rigidly couples the rails together, which increases a load capacity of the rails. The bracket may also be operative to reduce and/or prevent a deflection of the rails due to the device hanging from the rails and/or due to a moment load or other loading conditions placed on the device by, for example, a passenger. For example, the increased load capacity of the rails may result in a reduced deflection of the rails when weight is placed on (e.g., hung from) the rails. For example, because the bracket is installed using clamp plates to clamp the rails between the bracket and the clamp plates, and to effectively clamp the rails together, the structure of the bracket is operative to provide a rigid connection between the rails that would otherwise not exist. The rigid connection increases the load capacity of the rails. Additionally, because the bracket spans a length of, in some examples,—approximately 8-9 inches along the rails, a weight of the object (e.g., a cabin divider) coupled to the bracket is distributed along the length of the bracket instead of being concentrated at or near one point of the bracket. Thus, the bracket increases load carrying capacity and reduces deflection of the rails along a weakest axis (e.g., a lateral axis) of the rails. In some examples, the bracket may also support a moment load or other loading conditions caused by the device hanging from the bracket, and or a moment load or other loading conditions placed on the device hanging from the bracket. That is, a load caused by, for example, a passenger applying weight (e.g., using the device to support oneself when moving in and out of seat, using the device to support luggage, etc.) to the device does not adversely affect the coupling of the device to the bracket, or the coupling of the bracket to the rails.

FIG. 1 illustrates an example aircraft 100 within which the example apparatus described herein may be implemented. The example aircraft 100 may be a commercial aircraft including a passenger cabin 102. The example cabin 102 may include seats and/or other accommodations for passengers of the aircraft 100. The example aircraft 100 of FIG. 1 includes a fuselage 104 in which the cabin 102 is disposed. The example aircraft 100 includes wings 106 (e.g., a right wing and a left wing) extending laterally outward from the fuselage 104.

Figure 2:
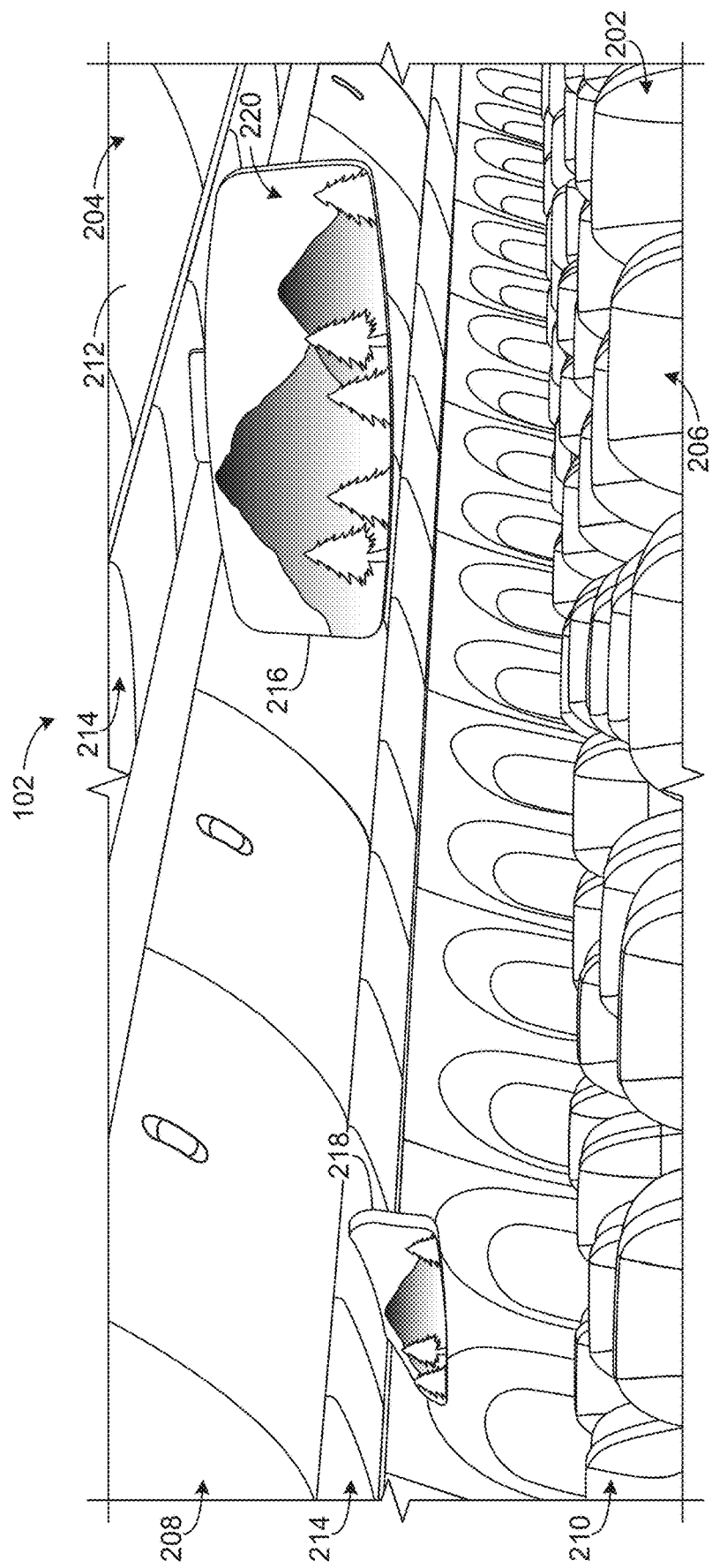
FIG. 2 depicts an example cabin in which the example apparatus may be implemented.

FIG. 2 depicts the example cabin 102 in which the example apparatus may be used. In the illustrated example, the cabin 102 includes seats 202 to accommodate passengers. The example cabin 102 includes two aisles, a central overhead section 204 above central seats 206, and at least one outboard overhead section 208 above peripheral seats 210. Alternatively, some cabins may include only one aisle and, thus, have two outboard overhead sections 208 and no central overhead section 204. Each of the central overhead section 204 and the outboard overhead section 208 include storage bins 212 to accommodate passenger luggage and/or other items. The central overhead section 204 may include storage bins 212 on either side of the central overhead section 204 that may be accessible from each aisle of the cabin 102.

The example central overhead section 204 and outboard overhead section 208 may include paneling 214 positioned above the seats 202. The examples panels 214 may vary in length from approximately 1 inch to approximately 14 inches. A width of the example panels 214 may be determined based on a size or a type of aircraft 100 in which the panels 214 are implemented. In some examples, larger panels may be used. The paneling 214 may include passenger service units (PSUs) (e.g., lights, vents, indicator lights) that may be accessible to the passengers during flight, and may also include emergency equipment (e.g., oxygen masks).

An example central cabin divider 216 and an example outboard cabin divider 218 may be attached to the respective central overhead section 204 and outboard overhead section 208. The example cabin dividers 216, 218 may be disposed between the panels 214 of the respective overhead sections 204, 208. The example cabin dividers 216, 218 may be operative to divide different areas (e.g., first class, business class, etc.) of the cabin 102. In some examples, the cabin dividers 216, 218 may include decoration 220 or signage (e.g., logos, patterns, etc.). In some such examples, the decoration 220 may be lighted. That is, a lighted logo, for example, may be included on the cabin divider 216, 218.

Figure 3:
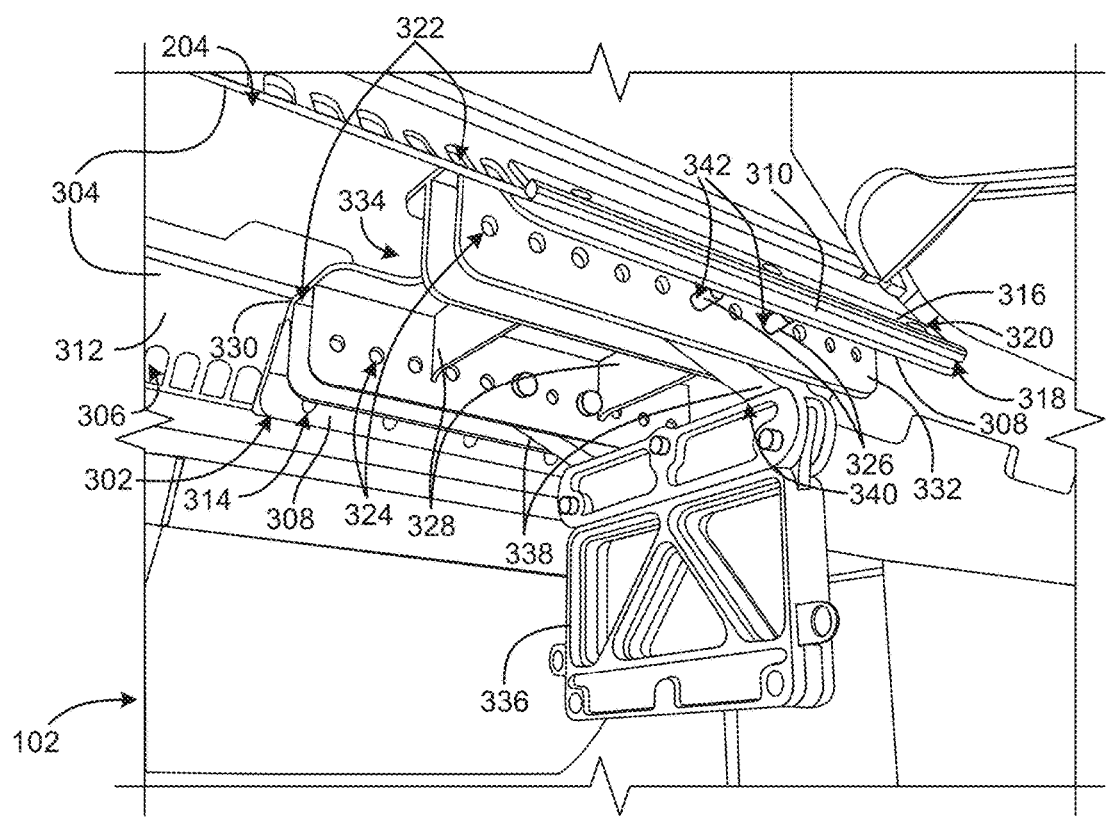
FIG. 3 depicts an example bracket installed in the example cabin.

FIG. 3 depicts an example bracket 302 installed in the example cabin 102. The example bracket 302 depicted in FIG. 3 is used to install the central cabin divider 216 in the central overhead section 204. The example bracket 302 may be made of a metal material (e.g., stainless steel, aluminum, a metal alloy, a composite, etc.) and may be a machined part. The example bracket 302 may be installed using existing rails 304 (e.g., passenger service unit (PSU) rails) disposed in the central overhead section 204 of the cabin 102. The rails 304 may be used to install passenger service units (PSUs) (e.g., lights, vents, indicator lights, oxygen masks) and/or the panels 214 of the central overhead section 204. Each of the example rails 304 includes apertures 306 along a length of the rail 304 that may be used as attachment points (e.g., fastening points). The apertures 306 are evenly spaced to enable positions of the different objects (e.g., PSUs, paneling 214, cabin dividers, etc.) coupled to the rails 304 to be adjustable to suit the needs of a particular cabin layout. For example, the seats 202 may be arranged differently in one cabin (e.g., the cabin 102) than another cabin and, thus, the PSUs, paneling 214, and cabin dividers 216, 218 may need to be positioned differently. After the bracket 302 is attached to the rails 304, the bracket 302 is rigidly fixed in position on the rails 304.

In the illustrated example, outer edges 308 of the bracket 302 are angled (e.g., relative to a horizontal plane of the bracket) to correspond to an angle of the rails 304. Thus, a surface 310 of each edge 308 of the bracket 302 is in contact with a surface 312 of the respective rails 304 along an entire length of the bracket 302. The surface 310 of the edge 308 of the bracket 302 includes apertures 314 spaced to correspond with the apertures 306 of the rails 304. The apertures 314 are used as attachment points (e.g., fastening points) on the bracket 302 to attach the bracket 302 to the rails 304. In the illustrated examples, the surface 310 includes three apertures 314, but in other examples the surface 310 may include another number of apertures.

To facilitate coupling the bracket 302 to the rails 304, clamp plates 316 may be used. The clamp plates 316 may also be made of a metal or composite material and may be machined parts. Each clamp plate 316 is operative to clamp the respective rail 304 between the surface 310 of the bracket 302 and a surface 318 of the clamp plate 316. The clamp plate 316 includes apertures 320 (e.g., attachment points, fastening points) corresponding to the apertures 314 of the surface 310 of the edge 308 of the bracket 302 (e.g., three apertures). The example clamp plates 316 extend along the rail 304 a length approximately equal to the length of the bracket 302. The clamp plates 316 are operative to increase the strength of the rails 304 by clamping each of the rails 304 between the respective clamp plates 316 and the surface 310 of the bracket 302, and by clamping the two rails 304 together using the bracket 302.

The example bracket 302 includes two sets of parallel flanges 322 perpendicular to a horizontal plane of the bracket 302. Each set of flanges 322 is positioned adjacent one of the edges 308 of the bracket 302. The respective sets of flanges 322 are spaced apart a distance greater than a distance between the flanges of each respective set of flanges 322. Alternatively, the bracket 302 may include only two flanges, each positioned adjacent a respective edge 308 of the bracket 302, rather than two sets of flanges 322. Each of the flanges 322 includes apertures (e.g., attachment points, fastening points) 324 to receive fasteners 326 to couple the cabin divider 216 to the bracket 302. The example flanges 322 have a length approximately equal to a total length of the bracket 302 (e.g., the flanges 322 define the length of the bracket 302). The flanges 322 include multiple apertures 324 to enable the cabin divider 216 to be positioned at multiple locations along the length of the bracket 302.

In the illustrated example, the bracket 302 includes ribs 328 disposed between the sets of flanges 322 of the bracket 302. The example ribs 328 may be operative to increase the structural integrity (e.g., a strength) of the bracket 302. In some examples, the ribs 328 also increase the load capacity of the bracket 302 and may help to increase the load capacity of the rails 304, which are rigidly coupled together via the bracket 302. That is, a set of rails 304 rigidly coupled by the example bracket 302 has a higher load capacity than a set of rails 304 that is not rigidly coupled by the example bracket 302. In some examples, a third edge 330 and a fourth edge 332 (e.g., front and back edges) of the bracket 302 include cutaway portions 334 disposed between the sets of flanges 322 and adjacent the ribs 328. The cutaway portions 334 may reduce a weight of the bracket 302.

The example bracket 302 may also be operative to decrease a deflection of the rails 304 and any underlying structure (e.g., structure to support a storage bin, panels separating the storage bin area from a component area, etc.). For example, objects (e.g., cabin dividers, screens, PSUs, signs, etc.) coupled to the rails 304 may deflect the rails 304 from an initial position (e.g., may cause the rails 304 to slightly bend at load concentrations). The increased load capacity of the rails 304 rigidly coupled by the bracket 302 may result in reduced deflections of the rails 304 due to concentrated loads (e.g., PSUs, cabin dividers, etc.) on the rails 304.

In some examples, the bracket 302 may be used to couple other devices to the rails 304. For example, the bracket 302 could be implemented to couple signage to the overhead sections. Other devices, such as screens (e.g., LCD screens such as television screens, informational screens, etc.) may also be coupled to the rails 304 using the example bracket 302. In some examples, the bracket 302 may be used to support an object that does not fit on the rails 304 (e.g., a projector, a non-standard light, medical supplies, oxygen masks, etc.) and/or that may be too heavy for the rails 304 to support without the load capacity added by the bracket 302. The example bracket 302 may also be operative to support aircraft components (e.g., electrical standoffs, transformers, etc.) above the bracket 302. That is, the example bracket 302 may be operative to mount any device to be used and/or viewed by passengers or crew during a flight, boarding and de-boarding, or during emergency situations to the overhead section.

In the illustrated example, an example interior support 336 of the cabin divider 216 includes protrusions 338 positioned on an upper edge 340 (e.g., an edge closest to the overhead section 204) of the interior support 336. The example protrusions 338 of the interior support 336 include two apertures 342 spaced apart to align with the apertures 324 of the flanges 322 of the bracket 302. The cabin divider 216 is coupled to the bracket 302 using the fasteners 326 disposed through apertures 342 of the flanges 322 of the bracket 302 that are aligned with the apertures 342 of the protrusions 338 of the interior support 336 of the cabin divider 216. In the illustrated example, the protrusions 338 of the interior support 336 are coupled to the bracket 302 using bolts. Alternatively, other types of fasteners, such as pins, goose neck fasteners, etc. may be used to couple the cabin divider 216 to the bracket 302.

Figure 4:
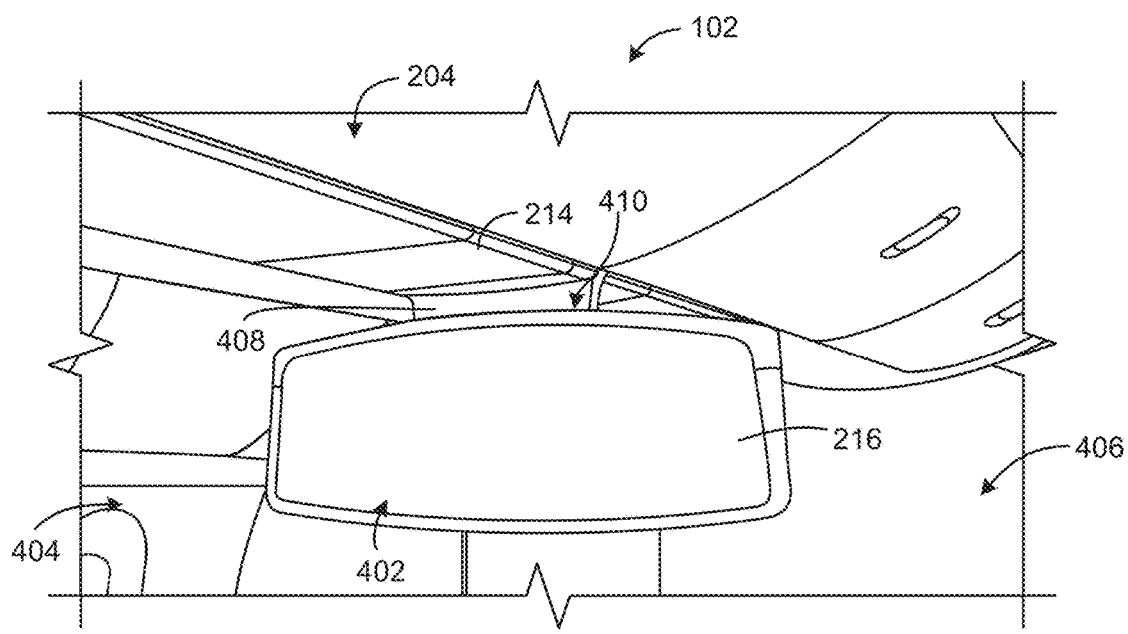
FIG. 4 depicts an example cabin divider installed using the example bracket.

FIG. 4 depicts the example central cabin divider 216 installed using the example bracket 302. As illustrated in FIG. 4, the example cabin divider 216 may be installed in the central overhead section 204 of the cabin 102. The example cabin divider 216 includes a large panel 402 (e.g., a composite panel, a plastic panel, a metal panel, a fabric panel, etc.) to divide a first portion 404 of the cabin 102 from a second portion 406 of the cabin 102. In some examples, the panels 402 of the example cabin divider 216 are fitted over an interior support structure (e.g., the interior support 336 of FIG. 3). The example panels 402 of the cabin divider 216 may be molded or formed using any other process. The panel 402 may include a decoration or signage and/or may include lighted elements.

The example cabin divider 216 includes a neck portion 408 approximately the width of the paneling 214 of the overhead section 204. The example neck portion 408 of the cabin divider 216 positioned between the large panel 402 and an upper surface 410 of the cabin divider 216 that is coupled to the rails 304 to aesthetically blend in with the other panels 214 coupled to the rails 304. The example upper surface 410 of the cabin divider 216 is operative to disguise any structural brackets or fasteners of the example cabin divider 216 or paneling 214 of the central overhead section 204. The example upper surface 410 is curved to match a curve of the example paneling 214.

As depicted in FIG. 4, the paneling 214 may be installed in the overhead section 204 to cover the bracket 302 and hide the bracket 302 from view. The paneling 214 may be coupled to the rails 304. Additionally, the paneling 214 may include passenger service units for use by the passengers during flight. The passengers service units are also operatively coupled to the rails 304. The paneling 214 and passenger service units fit over the example bracket 302 described in conjunction with FIG. 3, and the example bracket 302 does not interfere with the paneling 214 and/or the passenger service units.

Figure 5:
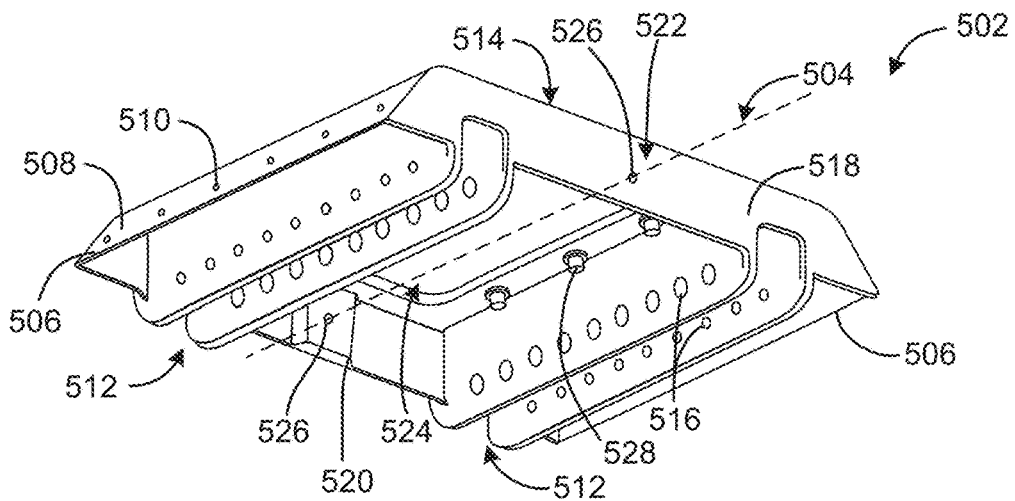
FIG. 5 depicts an example bracket that may be implemented with the example cabin divider.

FIG. 5 depicts an example bracket 502 that may be implemented in the example cabin 102. In the illustrated example, the bracket 502 may have a length of approximately 8-9 inches. However, for other implementations (e.g., for hanging objects of varying size and weight, for reinforcing the rails, etc.), the bracket 502 may range in length from 3 inches to 2 feet. As the length of the bracket 502 increases, the load capacity of the bracket 502 and the rails 304 increases. In some examples, the width of the bracket 502 varies based on the size or type of the aircraft 100 in which the bracket 502 is being implemented. The illustrated example bracket 502 of FIG. 5 is substantially symmetrical relative to a center line 504 of the bracket 502.

The example bracket 502 may be made of a metal material (e.g., stainless steel, aluminum, a metal alloy, a composite, etc.) and may be a machined part. In the illustrated example bracket 502, outer edges 506 of the bracket 502 are angled (e.g., relative to a horizontal plane of the bracket) to correspond to an angle of the rails 304 to which the example bracket 502 may be coupled. A surface 508 of the edge 506 of the bracket 502 of the illustrated example includes six apertures 510 (e.g., attachment points to attach the bracket 502 to the rails 304) evenly spaced and corresponding to the apertures 306 of the rails 304. In other examples, another number of apertures 510 may be used.

The example bracket 502 includes two sets of parallel flanges 512 perpendicular to an upper surface 514 (e.g., a horizontal plane) of the bracket 502. Each set of flanges 512 is positioned adjacent a respective one of the edges 506 of the bracket 502. The respective sets of flanges 512 are spaced apart a distance greater than a distance between the two flanges of each respective set of flanges 512. Alternatively, the bracket 502 may include only two flanges, each positioned adjacent a respective one of the edges 506 of the bracket 502, rather than two sets of flanges 512. Each of the flanges 512 includes apertures 516 (e.g., attachment points, fastening points) to receive fasteners to, in some examples, couple the cabin divider 216 or other object (e.g., a screen, a sign, etc.) to the bracket 502. The example flanges 512 have a length approximately equal to a total length of the bracket 502 (e.g., the flanges 512 define the length of the bracket 502). The flanges 512 include multiple apertures 516 to enable the cabin divider 216 or other object to be positioned at multiple locations along the length of the bracket 502. In the illustrated example, the flanges 512 each include nine apertures 516, but any other number of apertures 516 may be used instead. The spacing of the apertures 516 on the parallel flanges 512 need not correspond with the spacing of the apertures 510 on the angled surfaces 508 at the edges 506 of the bracket 502.

In the illustrated example, a third edge 518 and a fourth edge 520 (e.g., front and rear edges, forward and aft edges) of the bracket 502 include plates 522 extending between the flanges 512. The plates 522 extend downward from the horizontal upper surface 514 of the bracket 502. The example bracket 502 includes a central cutout 524 disposed between the flanges 512. The cutout 524 may reduce a weight of the bracket 502. In some examples, components (e.g., lighting components, electrical components, etc.) may be disposed through the central cutout 524 to facilitate connection of the components to an object or device coupled to the bracket 502.

In some examples, the plates 522 are operative to provide structural integrity or strength to the bracket 502. In some examples, the example bracket 502 is operative to increase a load capacity of the rails 304. That is, a set of rails 304 rigidly coupled by the example bracket 502 has a higher load capacity than a set of rails 304 that is not rigidly coupled by the example bracket 502. The increased load capacity of the rails 304 rigidly coupled by the bracket 502 may also result in reduced deflections of the rails 304 due to concentrated loads (e.g., PSUs, cabin dividers, etc.) on the rails 304.

In some examples, the bracket 502 is operative to support aircraft components coupled to the top of the bracket 502. For example, apertures 526 of the third and fourth edges 518, 520 may be operative to couple electrical components (e.g., electrical wires) to the bracket 502 and/or electrical wires may be disposed through the apertures 526 of the bracket 502. Fasteners 528 disposed on the upper surface 514 of the bracket 502 may be used to couple transformers, electrical standoffs, or other components to the upper surface 514 of the bracket 502.

Figure 6:
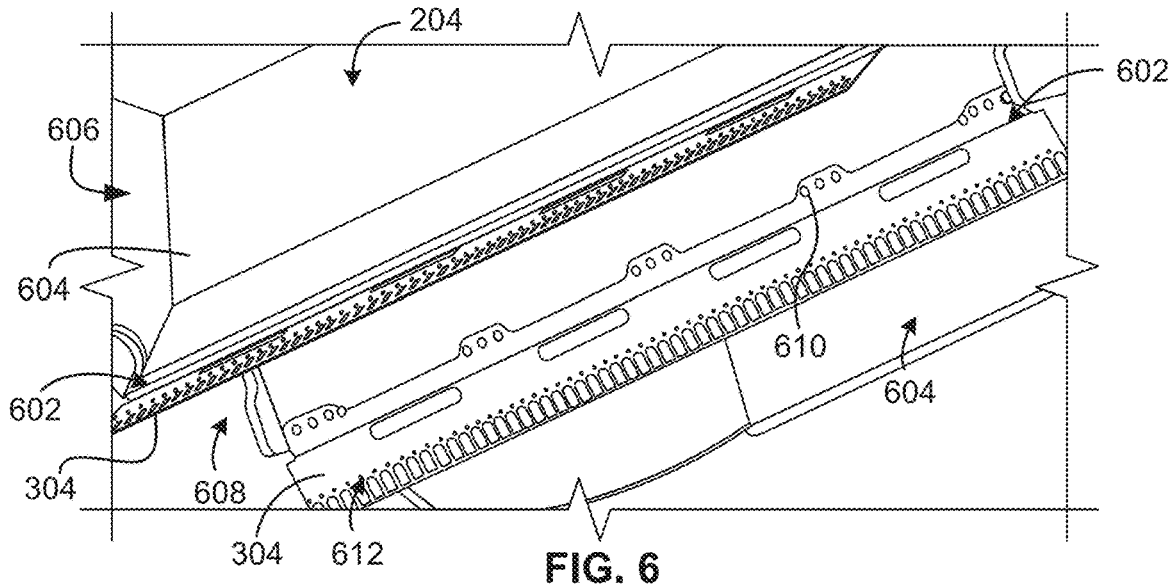
FIG. 6 depicts example rails that may be used to install the cabin divider in a central overhead section of the cabin.

FIG. 6 depicts the example rails 304 that may be used to install the cabin divider 216 on the central overhead section 204 of the cabin 102. The example rails 304 may be substantially similar and are coupled to edges 602 of the central overhead section 204. The example rails 304 are coupled adjacent to lower edges of a storage bin area 604. As depicted in FIG. 6, the example rails 304 are coupled to dividing panels 606 separating the storage bin areas 604 from a component area 608 of the central overhead section 204. The component area 608 is operative to house various components of the aircraft 100, including components related to the PSUs, electrical components (e.g., electrical wiring), air lines, etc.

The example rails 304 are coupled to the dividing panels 606 using fasteners 610 (e.g., bolts) disposed through upper apertures of the rails 304 and corresponding apertures of the dividing panels 606. The example rails 304 may be sized based on a portion of the cabin 102 of the aircraft 100 in which the rails 304 are positioned. In this illustrated example, the rails 304 include additional, smaller apertures 612 (e.g., attachment points, fastening points) positioned over the apertures 306 described in conjunction with FIG. 3. The example fasteners (e.g., fasteners 704 of FIG. 7) to couple the bracket 502 and the clamp plates 316 to the rails 304 may be disposed through the example smaller apertures 612 of the rails 304.

Figure 7:
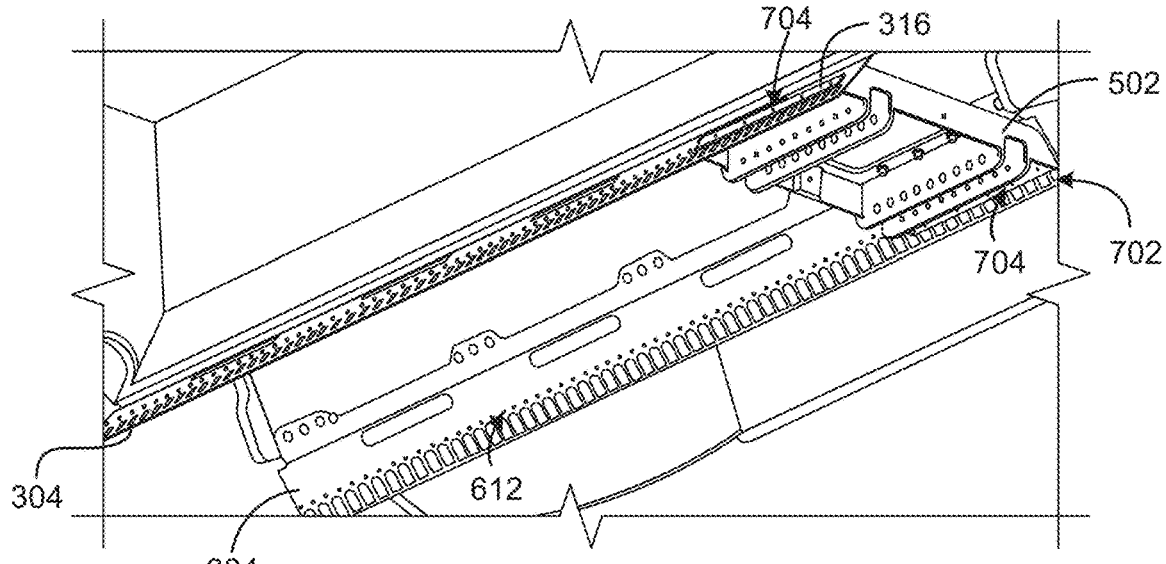
FIG. 7 depicts an example bracket that may be used to install the cabin divider on the rails of the central overhead section.

FIG. 7 depicts the example bracket 502 of FIG. 5 that may be used to install the cabin divider 216 coupled to the rails 304 of the central overhead section 204. The example bracket 502 may be coupled to the rails 304 using the smaller apertures 612 described in conjunction with FIG. 6. In the illustrated example, the bracket 502 is coupled to a first end 702 (e.g., a forward end, a front end) of the rails 304. However, the bracket 502 may be coupled at several positions along the length of the bracket 502. For example, the bracket 502 may be coupled to the rails 304 in any position in which the apertures 510 of the surface 508 of the edges 506 of the bracket 502 are aligned with the apertures 306 and/or the smaller apertures 612 of the rails 304. The clamp plates 316 and/or the bracket 502 may include additional apertures to couple the bracket 502 to the rails 304 via the smaller apertures 612 of the rails 304.

Figure 8:
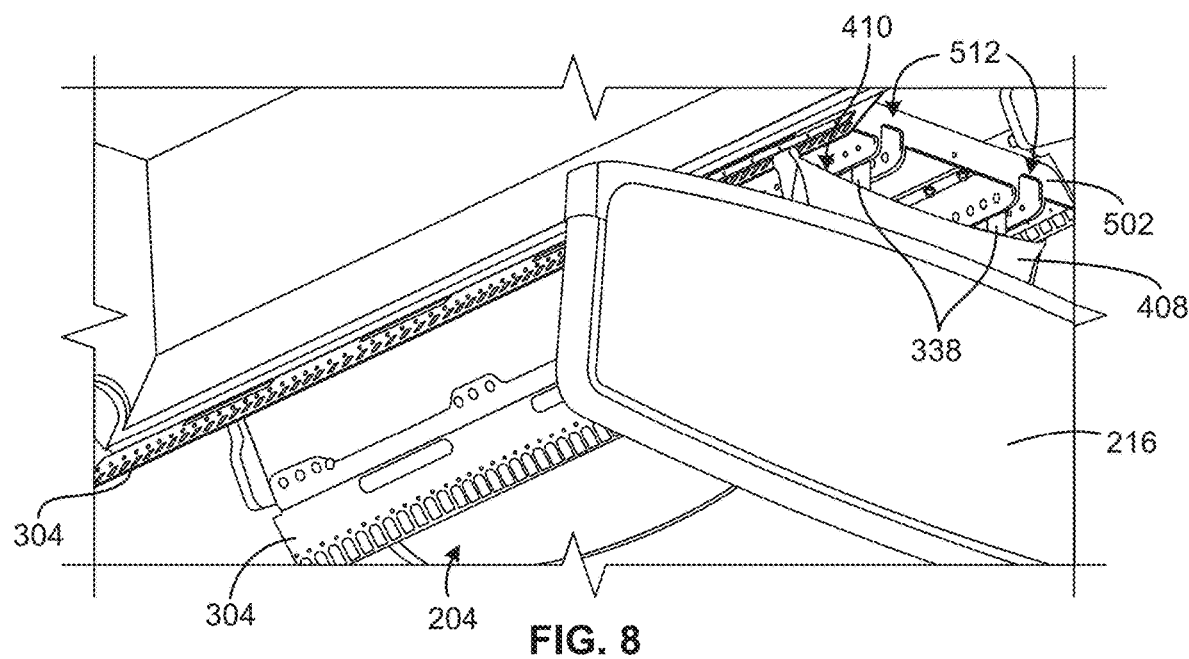
FIG. 8 depicts an example cabin divider that may be installed in the central overhead section.

FIG. 8 depicts the example cabin divider 216 that may be installed in the central overhead section 204. The example central cabin divider 216 is coupled to the bracket 502 via the protrusions 338 of the cabin divider 216. The protrusions 338 are disposed between the flanges 512 of the example bracket 502. Alternatively, the example protrusions 338 of the cabin divider 216 may be, in some examples, coupled to a single flange 512 of the bracket 502 rather than disposed between a set of flanges 512.

The neck portion 408 of the example cabin divider 216 is substantially the width of the central overhead section 204 and includes the upper surface 410 from which the example protrusions 338 of the cabin divider 216 extend. The example upper surface 410 may be curved to correspond to a curve of the panels 214 positioned adjacent to (e.g., on either side of, surrounding) the cabin divider 216. Thus, the upper surface 410 of the cabin divider 216 may be aesthetically similar to the panels 214 of the central overhead section 204

Figure 9:
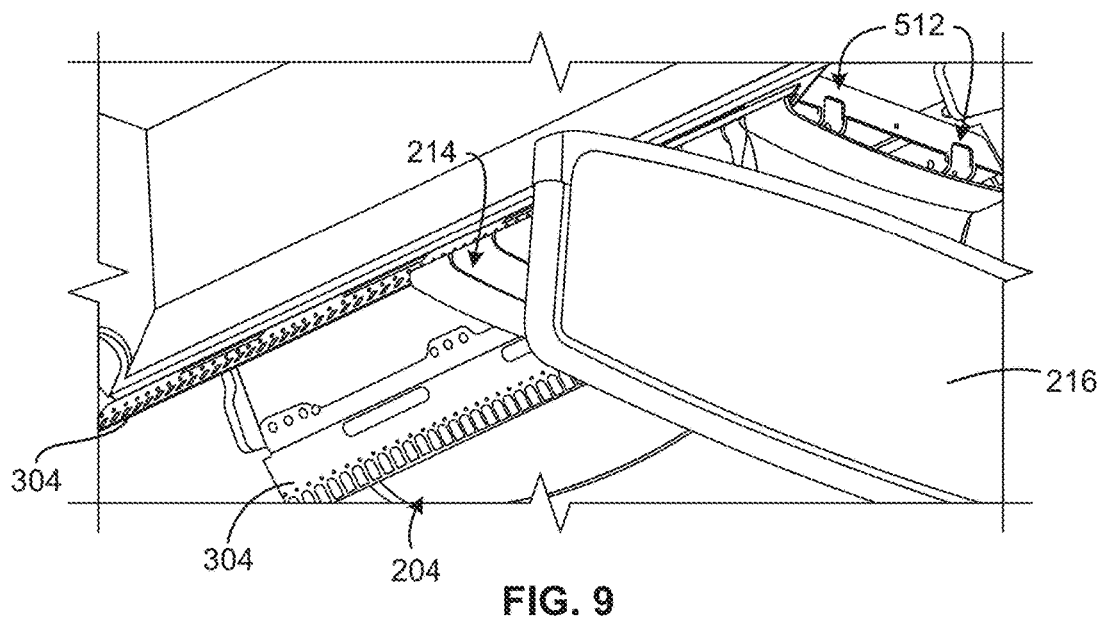
FIG. 9 depicts additional overhead paneling installed adjacent to the cabin divider in the central overhead section.

FIG. 9 depicts additional overhead paneling 214 installed adjacent to the cabin divider 216 on the central overhead section 204. As described in conjunction with FIG. 4, the example paneling 214 may be positioned or installed over the example bracket 502 to hide the example bracket 502 from view. The example bracket 502 does not interfere with the example paneling 214 or the example PSUs integrated into the paneling 214. In the illustrated example, the paneling 214 may include spacers, lighting panels, ventilation panels, and/or panels concealing drop-down oxygen masks.

In the illustrated example, the cabin divider 216 is positioned between a spacer and another panel 214. The second panel may be, for example, a spacer panel or another panel with components that fit under the bracket. In some examples, the second panel may be a lighting panel including indictor lights (e.g., a fasten seat belt indicator, an attendant call indicator, etc.). Alternatively or additionally, the example second panel may conceal drop-down oxygen masks, or may be a blank panel. The example panels 214 adjacent the cabin divider may also be ventilation panels including a vent corresponding to each passenger seat 202 positioned below the overhead section 204.

Figure 10:
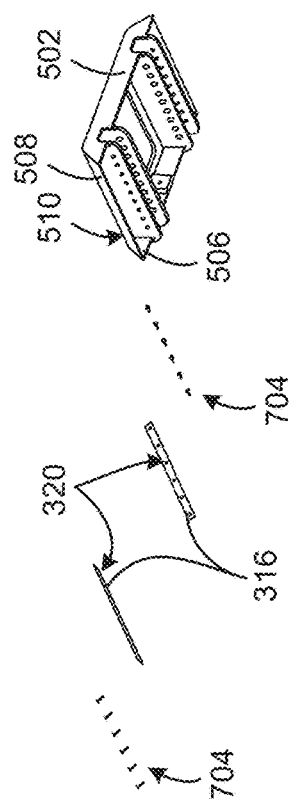
FIG. 10 graphically depicts an installation process of the bracket in the central overhead section.
Figure 10:
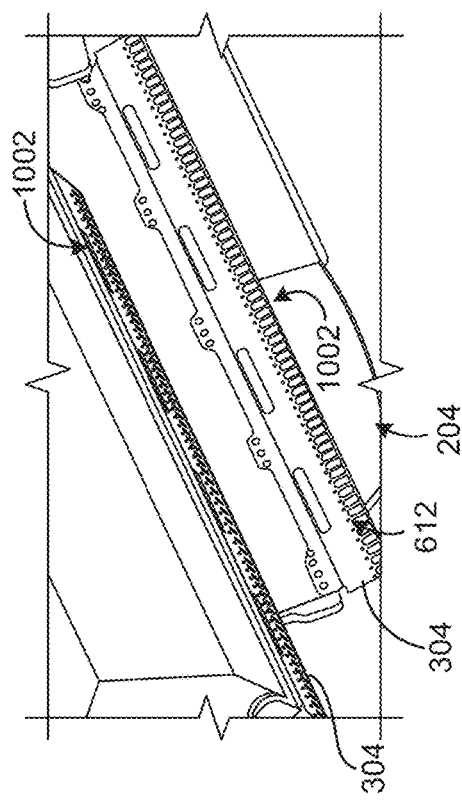

FIG. 10 graphically depicts an installation process of the bracket 502 on the central overhead section 204. The example bracket 502 may be installed using the rails 304 that are already in place within the overhead section 204 of the cabin 102. For example, if the cabin divider 216 is to be retrofitted for installation in an aircraft 100 already in use, the rails 304 of the overhead section 204 do not need to be replaced. The example bracket 502 may be installed at multiple positions along the length of the rails 304. The bracket 502 may be installed using the example clamp plates 316 and fasteners 704 to couple the example clamp plates 316 and the bracket 502 to the rails 304. To install the bracket 502, the apertures 510 on the surface 508 of the edge 506 of the bracket 502 are aligned with the apertures 612 of the rails 304 near a desired position for the cabin divider 216. The clamp plates 316 are positioned on outer surfaces 1002 of the rails 304, and the apertures 320 of the clamp plates 316 are aligned with the apertures 612 of the rails 304 and the apertures 510 of the bracket 502. When the apertures 320, 612, 510 are aligned, the fasteners 704 are disposed through the apertures 320, 612, 510 to rigidly couple the example bracket 502 to the example rails 304.

Figure 11:
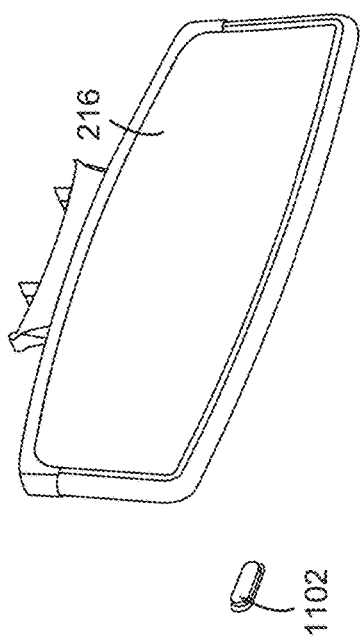
FIG. 11 graphically depicts an installation process of the cabin divider in the central overhead section.
Figure 11:
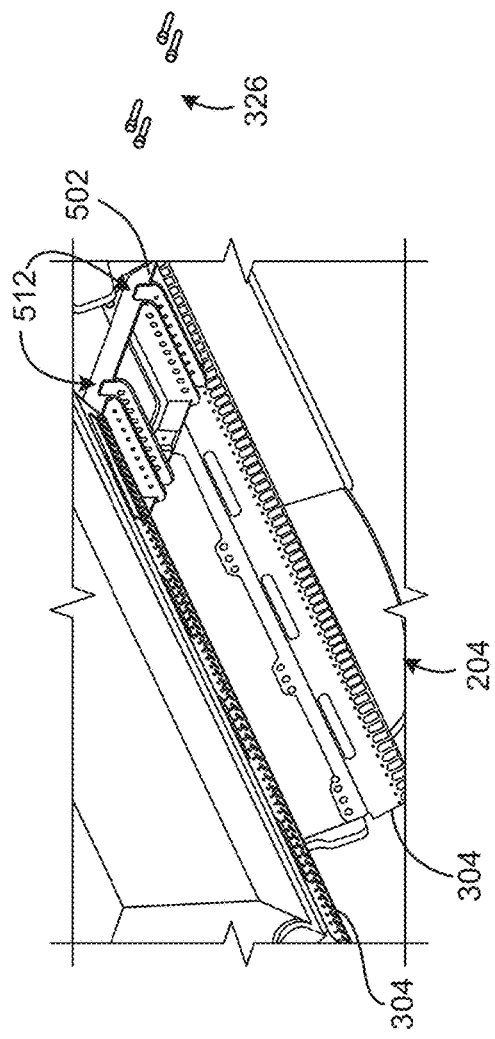

FIG. 11 graphically depicts an installation process of the cabin divider 216 on the central overhead section 204. The example cabin divider 216 may be coupled to the example bracket 502 using the fasteners 326. To install the cabin divider 216, the apertures 342 in the protrusions 338 at the top of the cabin divider 216 are aligned with the apertures 516 of the flanges 512 of the bracket 502. The cabin divider 216 may be installed at any position along the length of the bracket 502. When the apertures 342 of the protrusions 338 of the cabin divider 216 are aligned with the apertures 516 of the flanges 512 of the bracket 502 and the cabin divider 216 is in the desired position, the fasteners 326 may be disposed through the apertures 342, 516 to rigidly couple the cabin divider 216 to the bracket 502. The bracket 502 is operative to support moment load or other loading conditions on the rails 304 or the bracket 502 caused by and/or placed on the cabin divider 216. In some examples, prior to installing the cabin divider 216, a fasten seatbelt light 1102 is removed from the cabin divider 216 to enable the wiring for the fasten seatbelt light 1102 to be routed through a housing of the fasten seatbelt light 1102 and/or through the cabin divider 216.

Figure 12:
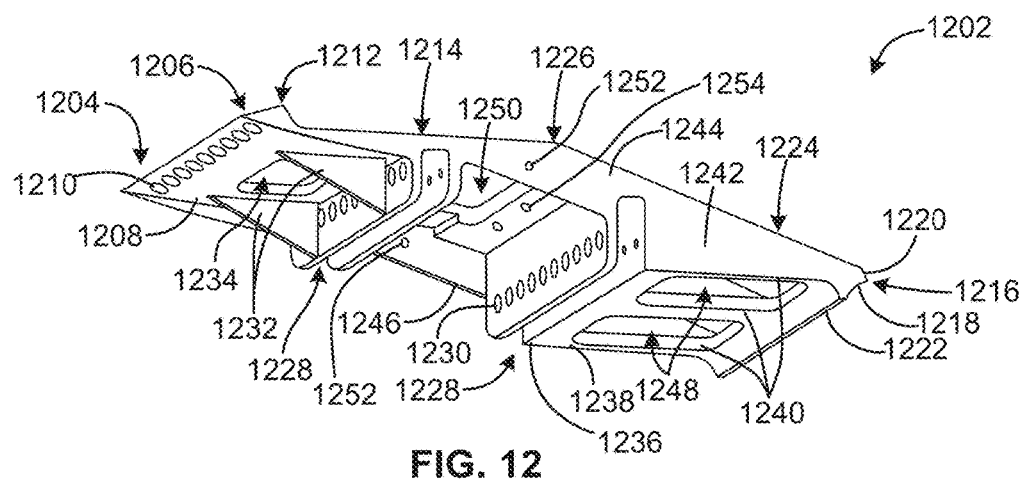
FIG. 12 depicts an example bracket that may be implemented with the example cabin divider.

FIG. 12 depicts an example bracket 1202 that may be implemented in the example cabin 102. The example bracket 1202 may be made of a metal material (e.g., stainless steel, aluminum, a metal alloy, a composite, etc.) and may be a machined part. The dimensions of the example bracket 1202 may vary based on the size or type of plane in which the bracket 1202 is implemented, and/or based on a desired increase in load capacity of the rails (e.g., rails 1302, 1304 in FIG. 13). For example, the bracket 1202 may have a length between approximately 3 inches and 2 feet, and the length of the bracket 1202 correlates with the increase in the amount the load capacity of the rails 1302, 1304.

The example bracket 1202 includes a first edge 1204 to be coupled to a rail (e.g., the first rail 1302 of FIG. 13) of the outboard overhead section 208. The first edge 1204 may include an angled surface 1206 corresponding to the angle of the rail. The first edge 1204 may include a substantially flat surface 1208 (e.g., relative to a horizontal plane) that intersects the angled surface 1206 at the first edge 1204. The first edge 1204 includes apertures 1210 (e.g., attachment points, fastening points) to facilitate attachment of the example bracket 1202 to the rail 1302. In the illustrated example, the angled surface 1206 of first edge 1204 may form a projection 1212 relative to a first upper surface or plane 1214 of the bracket 1202. The projection 1212 enables the angled surface 1206 to be in contact with the rail 1302 and with a ridge of the outboard overhead section 208.

A second edge 1216 of the example bracket 1202 may be coupled to a second rail (e.g., the second rail 1304 of FIG. 13) of the outboard overhead section 208. The second edge 1216 may include a curved surface 1218 corresponding to a curve of the second rail 1304. The curved surface 1218 of the bracket 1202 allows the second edge 1216 of the bracket 1202 to maintain contact with the second rail 1304 when the bracket 1202 is coupled to the rail 1304.

The second edge 1216 of the bracket 1202 may further be formed by two substantially flat surfaces 1220, 1222 positioned on either side of the curved surface 1218. A second upper surface or plane 1224 of the bracket 1202 may terminate at the first substantially flat surface 1220. The second upper surface 1224 of the bracket 1202 and the first upper surface 1214 of the bracket 1202 have different angles and, in the illustrated example, meet at an edge 1226 on the upper side of the bracket 1202.

The example bracket includes two sets of flanges 1228 disposed between the first and second edges 1204, 1216. Each of the flanges 1228 includes corresponding apertures 1230 (e.g., attachment points, fastening points) that are aligned and may be operative to hang an object from the bracket 1202. A first set of flanges 1228 is disposed adjacent the first edge 1204. The first set of flanges 1228 are spaced apart from one another to enable a protrusion of an object hanging from the bracket 1202 to be disposed between the flanges 1228. One or more ribs 1232 may be coupled to a flange of the first set of flanges 1228. The ribs 1232 may be support ribs extending from the flange 1228 toward the first edge 1204. The example ribs 1232 are positioned between the apertures 1230 of the flange 1228 so as not to interfere with the apertures 1230 and/or any fasteners that may be disposed through the apertures 1230. A cutout 1234 may be positioned between the two ribs 1232. In some examples, the cutout 1234 is operative to reduce a weight of the bracket 1202.

The example second set of flanges 1228 may be disposed nearer to the second edge 1216. The second set of flanges 1228 may have a greater height than the first set of flanges 1228 to ensure that the apertures 1230 of both sets of flanges 1228 are aligned on a single horizontal plane when the bracket 1202 is installed. A first flange of the second set of flanges 1228 positioned nearer to the second edge 1216 may include a bottom edge 1236 flush with a lower surface 1238 of the example bracket 1202. That is, the first flange of the second set of flanges 1228 may substantially be a surface of the bracket 1202 rather than a flange extending from the bracket 1202. Ribs 1240 may extend between the first of the second set of flanges 1228 and the second edge 1216. The example ribs 1240 may be support ribs. In the illustrated example, the example bracket 1202 includes three ribs 1240. The two outer ones of the three ribs 1240 may include surfaces 1242 flush with a side surface of the first of the second set of flanges 1228 and may partially define a third edge 1244 and a fourth edge 1246 of the bracket 1202. One or more cutouts 1248 may be disposed between the ribs 1240 to decrease the weight of the bracket 1202.

Additionally, in the illustrated example, a central cutout 1250 may be disposed between the sets of flanges 1228 to further reduce the weight of the bracket 1202. The third and fourth edges 1244, 1246 of the example bracket 1202 extending between the sets of flanges 1228 may act as central support ribs. The third and fourth edges 1244, 1246 extend downward from the first and second upper surfaces 1214, 1224 of the bracket 1202.

Figure 13:
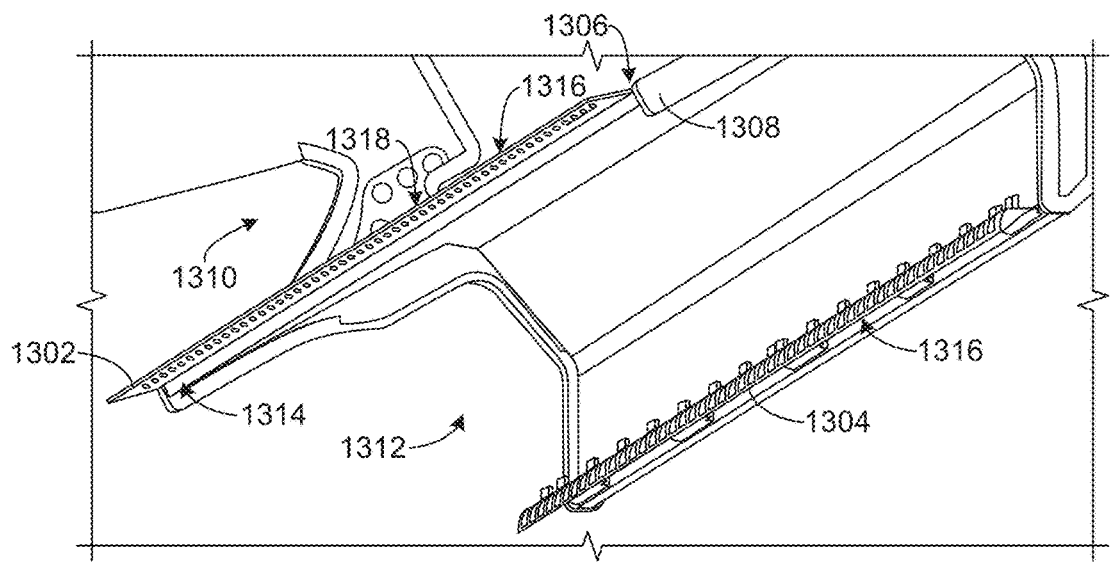
FIG. 13 depicts example rails that may be used to install the cabin divider in an outboard overhead section of the cabin.

FIG. 13 depicts the example rails 1302, 1304 that may be used to install the cabin divider 218 in an outboard overhead section 208 of the cabin 102. The example outboard overhead section 208 may be located under the storage bins 212 on either side of the cabin 102. Similar to the central overhead section 204, the outboard overhead section 208 may include spacers, lighting panels, ventilation panels, and/or panels concealing drop-down oxygen masks. In the illustrated example, the outboard overhead section 208 includes two rails 1302, 1304. A first rail 1302 (e.g., an interior rail, an inboard rail) located on the aisle side of the outboard overhead section 208 is coupled to the outboard overhead section 208 adjacent the edge of an outboard storage bin 212. The first rail 1302 is positioned at an angle directed away from the outboard overhead section 208. The first rail 1302 is coupled on an upper side 1306 of an edge 1308 of a panel separating an outboard storage bin area 1310 and an outboard component area 1312, forming a ridge 1314 adjacent the first rail 1302. The second rail 1304 (e.g., an outboard rail) is coupled to a far side of the outboard overhead section 208 may be curved downward. Both of the example rails 1302, 1304 include apertures 1316 (e.g., attachment points, fastening points) to enable passenger service units or panels 214 to be coupled to the outboard overhead section 208.

In the illustrated example, the first rail 1302 may be weaker (e.g., able to support less weight) than the second rail 1302. In such examples, the bracket 1202 is operative to accommodate for the different strengths of the rails 1302, 1304. For example, the bracket 1202 may be biased to distribute more of the weight of an object (e.g., a cabin divider 216, 218) hanging from the bracket 1202 on the second rail 1304 than on the first rail 1302. Alternatively, a stiffener plate (e.g., stiffener plate 1702 of FIG. 17) may be coupled to the first rail 1302 to increase the strength of the first rail 1302. In other examples, the rails 1302, 1304 may have substantially equal strengths. Additionally or alternatively, in some examples, a stiffener plate may be used with an example bracket 302, 502 coupled to rails 304 of a central overhead section 204.

In some examples, the bracket 1202 is operative to support aircraft components coupled to the top of the bracket 1202. For example, apertures 1252 of the third and fourth edges 1244, 1246 may be operative to couple electrical components (e.g., electrical wires) to the bracket 1202 and/or electrical wires may be disposed through the apertures 1252 of the bracket 1202. Fasteners 1254 disposed of the first upper surface 1214 and the second upper surface 1224 of the bracket 1202 may be used to couple transformers, electrical standoffs, or other components to the first and second upper surfaces 1214, 1224 of the bracket 1202.

As depicted in FIG. 13, the example rails 1302, 1304 are coupled to dividing panels 1318 separating the storage bin area 1310 from the component area 1312 of an overhead section. The component area 1312 is operative to house various components of the aircraft 100, including components related to the PSUs, electrical components (e.g., electrical wiring), air lines, etc. The example rails 1302, 1304 may be coupled to the dividing panels 1318 using fasteners (e.g., bolts). The example rails 1302, 1304 may be sized based on a portion of the cabin 102 of the aircraft 100 in which the rails 1302, 1304 are positioned.

Figure 14:
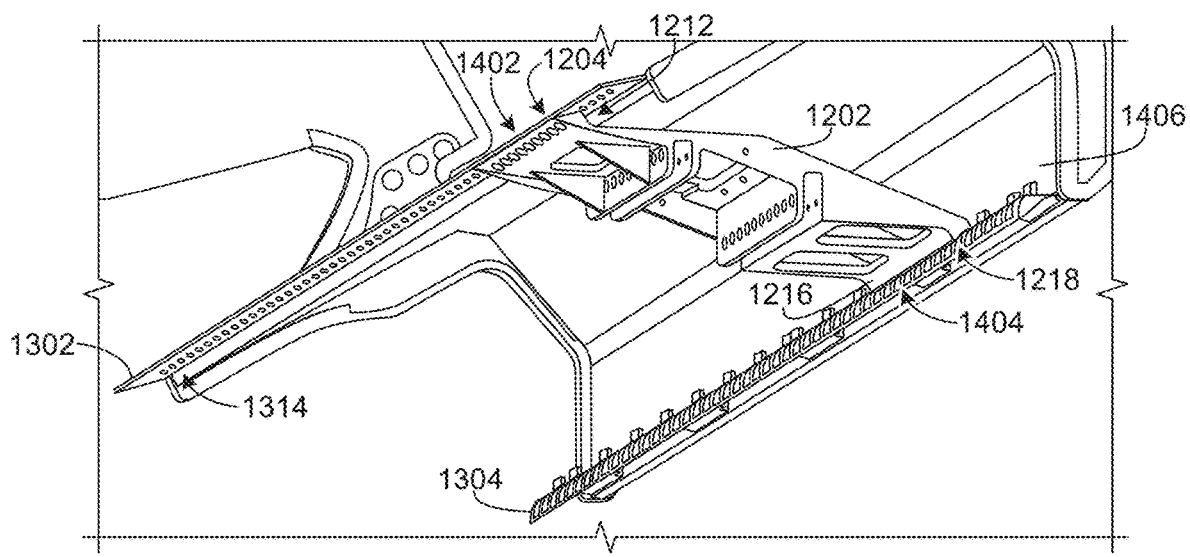
FIG. 14 depicts an example bracket that may be used to install the cabin divider on the rails of the outboard overhead section.

FIG. 14 depicts an example bracket 1202 that may be used to install the cabin divider 218 on the rails 1302, 1304 of the outboard overhead section 208. The first edge 1204 of the example bracket 1202 includes the angled surface 1206 to correspond to the angle of the example first rail 1302. In the illustrated example, the first edge 1204 is coupled to the first rail 1302 (e.g., an inboard rail) using fasteners 1402 (e.g., pins, bolts, etc.) disposed through apertures 1210 of the first edge 1204 of the bracket 1202 and through the first edge 1204 of the rail 1302. The projection 1212 formed by the angled surface 1206 of the first edge 1204 of the bracket 1202 enables the angled surface 1206 to be in contact with the first rail 1302 and with the ridge 1314 of the outboard overhead section 208.

The second edge 1216 of the example bracket 1202 may be coupled to the second rail 1304 (e.g., an outboard rail) of the outboard overhead section 208. The curved surface 1218 of the second edge 1216 corresponds to the curve of the second rail 1304. The curved surface 1218 of the bracket 1202 allows the second edge 1216 of the bracket 1202 to maintain contact with the curved second rail 1304 when the bracket 1202 is coupled to the second rail 1304. The second edge 1216 of the curved surface 1218 is coupled to the second rail 1304 via fasteners 1404 disposed through the apertures 1316 of the second rail 1304 and through apertures 1230 of the second edge 1216 of the bracket 1202. The first substantially flat surface 1220 of the second edge 1216 may be in contact with a panel 1406 of the outboard overhead section 208.

Figure 15:
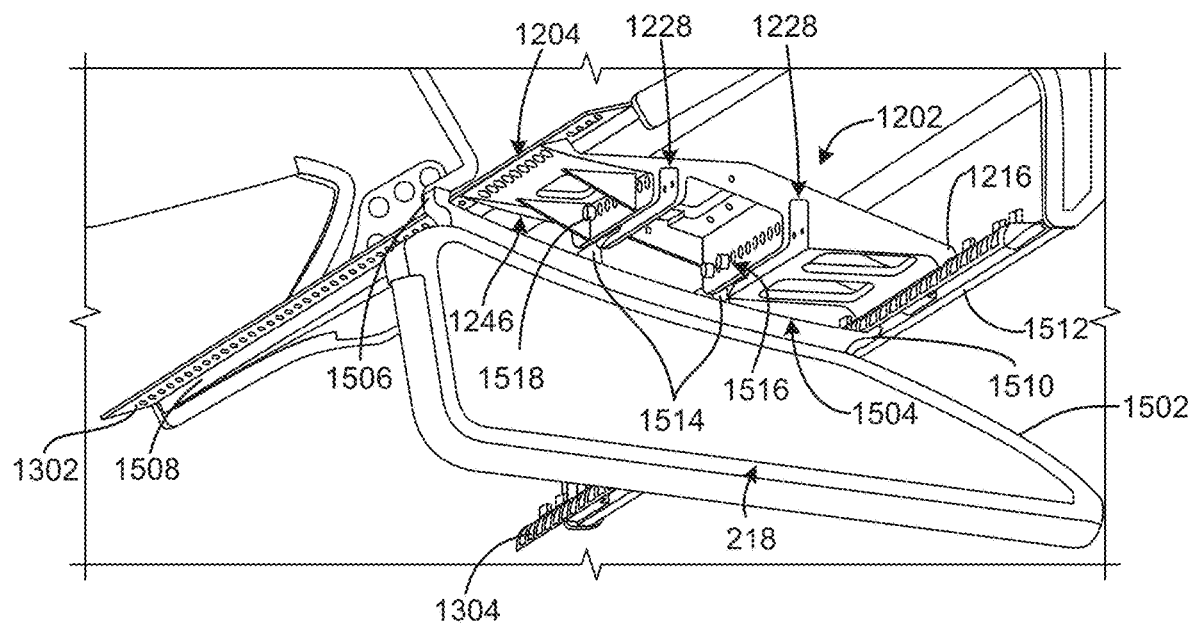
FIG. 15 depicts an example cabin divider that may be installed in the outboard overhead section.

FIG. 15 depicts an example cabin divider 218 that may be installed on the outboard overhead section 208. The example cabin divider 218 may be asymmetrical and operative to divide portions of the cabin 102. The example cabin divider 218 includes a tapered upper edge 1502 corresponding to an outer wall of the cabin 102. The cabin divider 218 may also include a curved upper edge 1504 corresponding to a curve of panels 214 of the example outboard overhead section 208. The curved upper edge 1504 may extend between a first projection 1506 positioned near a first edge 1508 (e.g., an interior edge) of the outboard overhead section 208 to a second projection 1510 positioned adjacent a second edge 1512 (e.g., an outboard edge) of the outboard overhead section 208. The projections 1506, 1510 may be positioned outside of the respective first and second rails 1302, 1304.

The example curved surface 1504 may include protrusions 1514 disposed along the curved surface 1504 between the first and second edges 1508, 1512 of the curved surface 1504. The protrusions 1514 are operative to couple the cabin divider 218 to the example bracket 1202. The example protrusions 1514 are positioned along the curved edge 1504 of the cabin divider 218 such that the protrusions 1514 are disposed between the flanges 1228 of each of the two sets of flanges 1228 on the example bracket 1202. The example protrusions 1514 include two apertures 1516 (e.g., attachment points, fastening points) corresponding to the apertures 1230 of the example flanges 1228 of the bracket 1202. Fasteners 1518 are disposed through the apertures 1230 of the protrusions 1514 of the cabin divider 218 and corresponding apertures 1230 of the flanges 1228 of the bracket 1202. The example cabin divider 218 may be positioned in multiple locations along the length of the bracket 1202. In the illustrated example, the cabin divider 218 is positioned adjacent the fourth edge 1246 (e.g., a rear edge, an aft edge) of the example bracket 1202.

Figure 16:
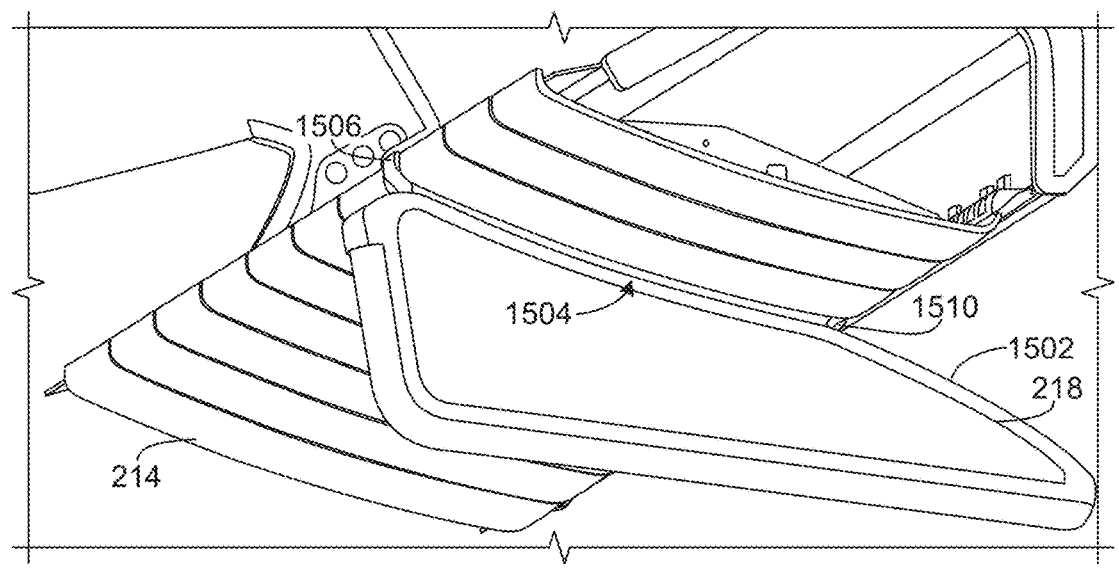
FIG. 16 depicts additional overhead paneling installed adjacent to the cabin divider in the outboard overhead section.

FIG. 16 depicts additional overhead paneling 214 installed adjacent to the cabin divider 218 on the outboard overhead section 208. The example paneling 214 may be positioned or installed over (e.g., outside of) the example bracket 1202. The example bracket 1202 does not interfere with the example paneling 214 or the example PSUs integrated into the paneling 214. In the illustrated example, the paneling 214 may include spacers, lighting panels, ventilation panels, and/or panels concealing drop-down oxygen masks.

In the illustrated example, the cabin divider 218 is positioned between a spacer and another panel. The second panel may be a blank panel. Alternatively or additionally, the example second panel may be a spacer panel or another panel with components that fit under the bracket. In some examples, the second panel may be a lighting panel including indictor lights (e.g., a fasten seat belt indicator, an attendant call indicator, etc.). The example panels 214 adjacent the spacer and second panel may conceal dropdown oxygen masks or may be ventilation panels including a vent corresponding to each passenger seat 202 positioned below the overhead section 208.

Figure 17:
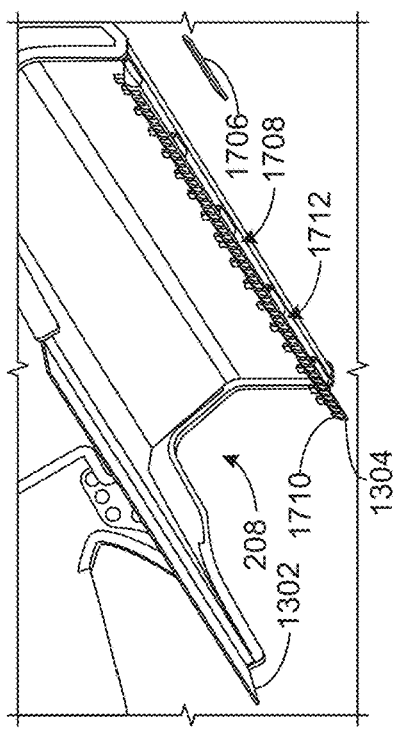
FIG. 17 graphically depicts an installation process of the bracket on the outboard overhead section.
Figure 17:
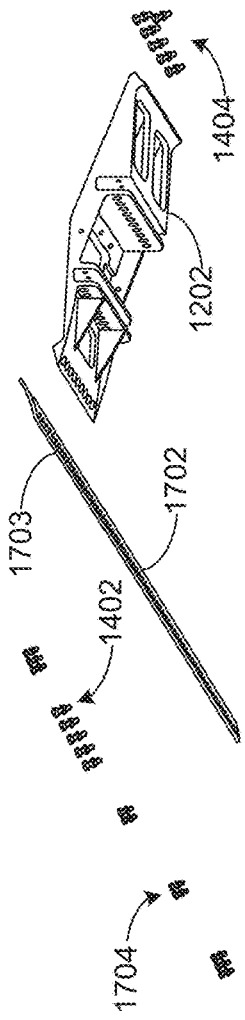

FIG. 17 graphically depicts an installation process of the bracket 1202 on the outboard overhead section 208. As depicted in FIG. 13, the example bracket 1202 may be installed using the existing rails 1302, 1304 of the outboard overhead section 208 of the aircraft 100. In the illustrated example, a stiffener plate 1702 having apertures 1703 (e.g., attachment points) may be added to the example first rail 1302 (e.g., the interior rail) to facilitate coupling of the bracket 1202 to the first rail 1302. The example stiffener plate 1702 may be installed by removing existing fasteners coupling the first rail 1302 to the panel 1318 of the overhead section 208. The stiffener plate 1702 is then fitted over the first rail 1302, and the stiffener plate 1702 and first rail 1302 are coupled to the panel 1318 using new fasteners 1704 longer than the original fasteners. In some examples, the bracket 1202 is coupled to the first rail 1302 and stiffener plate 1702 as the stiffener plate 1720 and first rail 1302 are coupled to the panel 1318. In such examples, fasteners 1402 that may be disposed through the example bracket 1202, the stiffener plate 1702 and the first rail 1302 to couple the bracket 1202, stiffener plate 1702, and first rail 1302 to the panel 1318 are used. Alternatively, the bracket 1202 may be coupled to the stiffener plate 1702 and the first rail 1302 after the stiffener plate 1702 and first rail 1302 are installed on the panel 1318.

The bracket 1202 may be coupled to the second rail 1304 (e.g., the outboard rail) using fasteners 1404 and an outboard clamp plate 1706. The example outboard clamp plate 1706 is disposed on an outer edge 1708 of the example second rail 1304. The fasteners 1404 are disposed through apertures 1230 of the bracket 1202, the second rail 1304, and the outboard clamp plate 1706 to couple the bracket 1202 to the second rail 1304. In the illustrated example, because the second rail 1304 is curved, the bracket 1202 is positioned on an upper surface 1710 of the second rail 1304, and the outboard clamp plate 1706 is positioned on the under surface 1712 of the second rail 1304.

Figure 18:
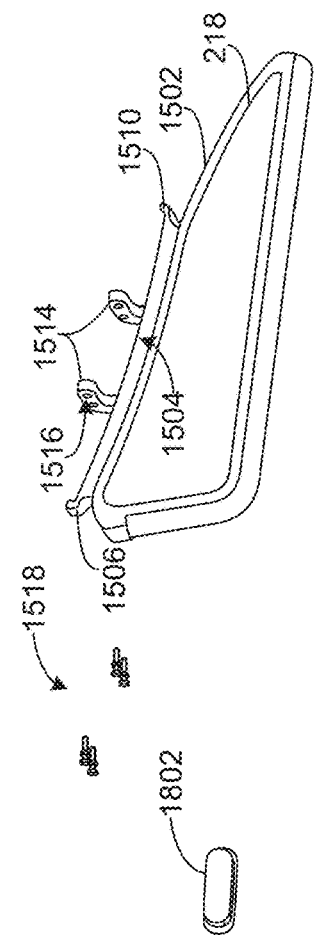
FIG. 18 graphically depicts an installation process of the cabin divider in the outboard overhead section.
Figure 18:
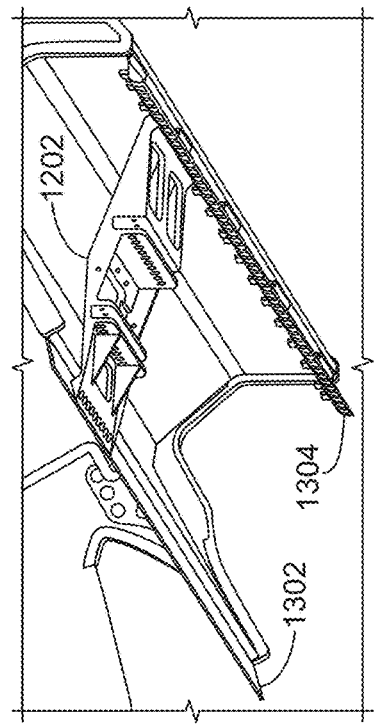

FIG. 18 graphically depicts an installation process of the cabin divider 218 on the outboard overhead section 208. After the bracket 1202 is installed, the cabin divider 218 can be coupled to the bracket 1202. The cabin divider 218 is positioned along the length of the bracket 1202 in the desired location. The apertures 1516 of the protrusions 1514 of the cabin divider 218 are aligned with the apertures 1230 of the flanges 1228 of the bracket 1202. Fasteners 1518 are disposed through the example apertures 1230 of the bracket 1202 and the apertures 1516 of the cabin divider 218. Once installed, the cabin divider 218 is operative to withstand moment loads (e.g., moment loads) placed on the cabin divider 218 and/or loads (e.g., moment loads) on the bracket 1202 caused by the cabin divider 218. In some examples, prior to installing the cabin divider 218, a fasten seatbelt light 1802 is removed from the cabin divider 218 to enable the wiring for the fasten seatbelt light 1802 to be routed through a housing of the fasten seatbelt light 1802 and/or through the cabin divider 218.

Figure 19:
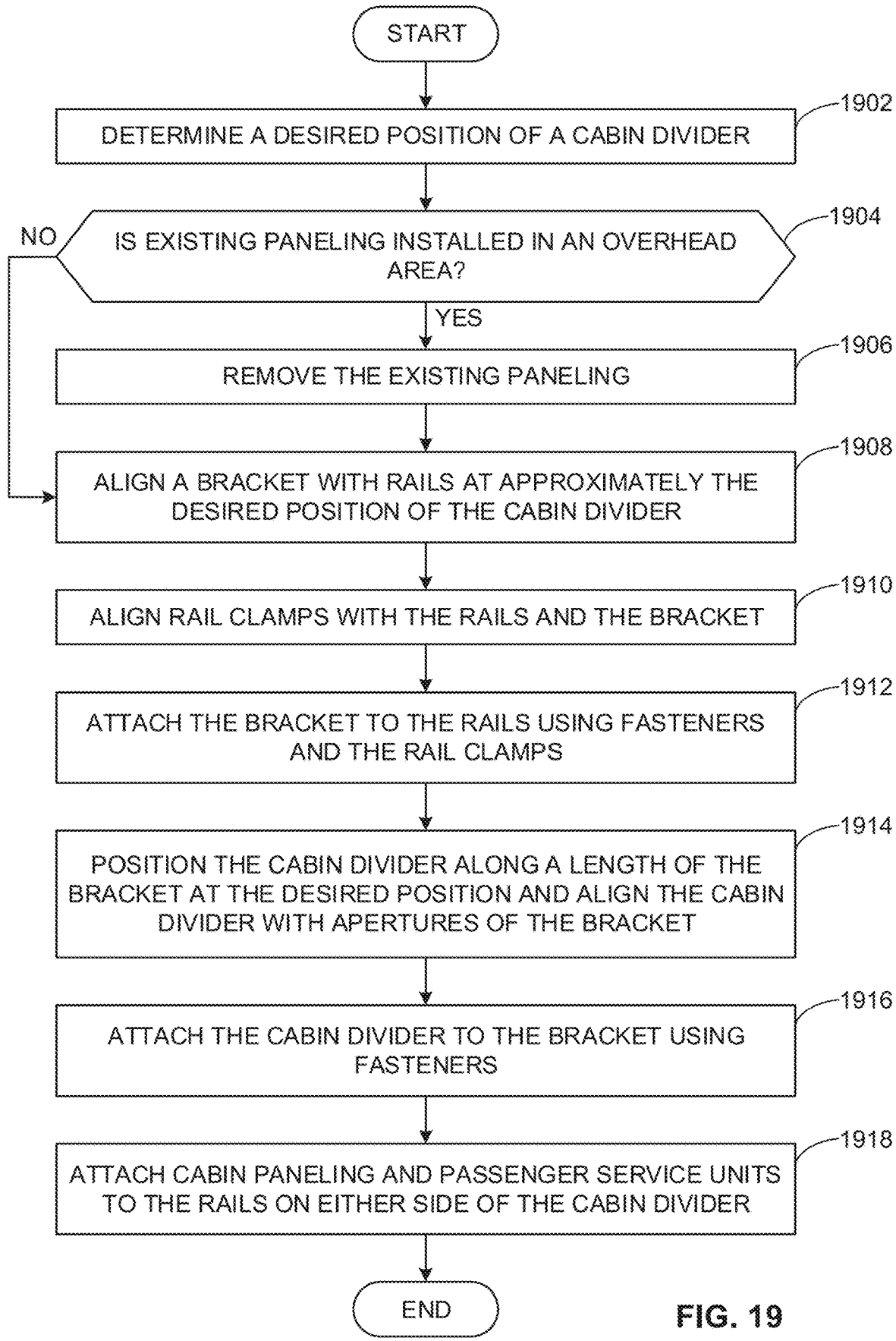
FIG. 19 is a flowchart representing an example method of installing a cabin divider in the overhead section using the example bracket.
Figure 20:
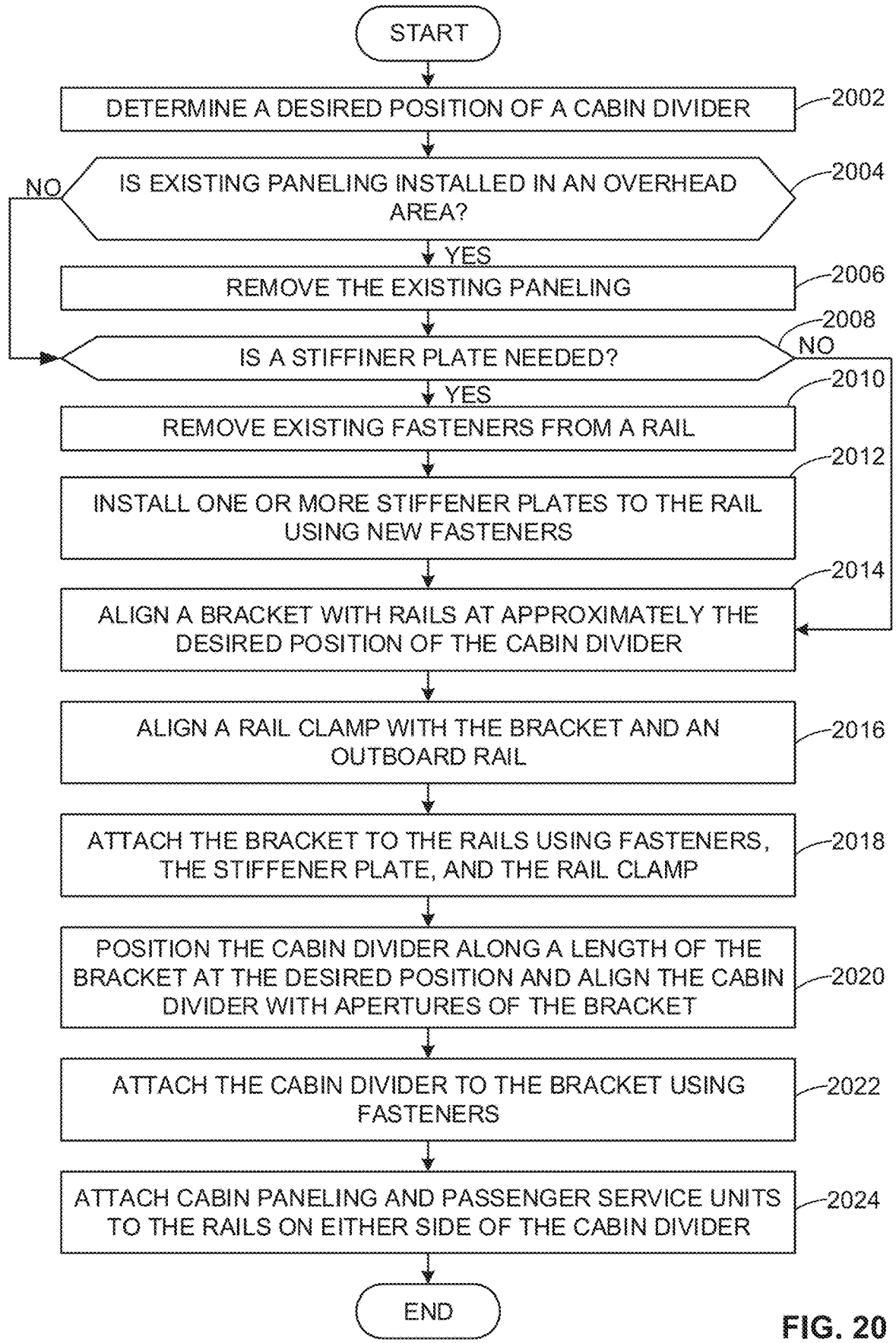
FIG. 20 is a flowchart representing an example method of installing a cabin divider in the overhead section using the example bracket.

FIGS. 19 and 20 are flowcharts representing example methods 1900, 2000 of installing the example cabin dividers 216, 218 in the cabin 102 of the example aircraft 100. The example methods 1900, 2000 may be processes of manufacture and/or may be, in some examples, implemented at least partially by one or more machines in a manufacturing plant, or by an individual.

FIG. 19 is a flowchart representing an example method 1900 of installing a cabin divider in the central overhead section 204 using the example bracket 502. The example method of 1900 may also be used to install brackets 302, 502, 1202 on rails 304 that do not need a stiffener plate 1702. The example method 1900 begins by determining a desired position of the cabin divider 216 (block 1902). The desired position of the cabin divider 216 may be determined based on a seating arrangement in the cabin 102 of the aircraft 100. Next, a person may determine if existing paneling 214 is installed in an overhead section (e.g., a central overhead section 204) of the aircraft 100 (block 1904). If existing paneling 214 is installed in the overhead section 204 of the aircraft 100, the existing paneling 214 is removed (block 1906).

If there is not existing paneling 214 in the overhead section 204 of the aircraft 100, or after the existing paneling 214 is removed, a bracket 502 is aligned with existing rails 304 of the overhead section 204 at approximately the desired position (block 1908). For example, the bracket 502 is aligned by aligning apertures 510 of the bracket 502 with apertures 306 of the rails 304. Clamp plates 316 are then aligned with the rails 304 and the bracket 502 (block 1910). The clamp plates 316 also include apertures 320 that may be aligned with the apertures 510 of the bracket 502 and the rails 304. The bracket 502 is attached to the rails 304 using fasteners 704 (e.g., bolts, pins, etc.) and the clamp plates 316 (block 1912). The fasteners 704 are disposed through the apertures 510 of the bracket, the rails 304, and the clamp plates 316.

To install the cabin divider 216 on the bracket 502, the cabin divider 216 is positioned in the desired location along the length of the bracket 502 and aligned with the apertures 324 of the bracket (block 1914). The example cabin divider 216 includes protrusions 338 having apertures 342 to be aligned with apertures 324 of flanges of the bracket 502. The cabin divider 216 is attached to the bracket 502 using fasteners 326 disposed through the apertures 324 of the bracket 502 and the apertures 342 of the cabin divider 216 (block 1916). After the cabin divider 216 is installed, cabin paneling 214 and PSUs may be attached to the rails 304 of the overhead section 204 and positioned on either side of the cabin divider 216 (block 1918). For example, the panels 214 and PSUs may include blank panels, lighting panels, ventilation panels, etc., and may include components (e.g., wiring, ventilation paths, etc.) disposed within the overhead section 204 above the panels 214.

FIG. 20 is a flowchart representing an example method 2000 of installing a cabin divider 218 in the outboard overhead section 208 using the example bracket 1202. The example method 2000 may also be used to install brackets 302, 502, 1202 on rails 1302, 1304 where at least one of the rails (e.g., the inner rail 1302) needs a stiffener plate 1702. The example method 2000 begins by determining a desired position of a cabin divider 218 (block 2002). The desired position of the cabin divider 218 may be determined based on a seating arrangement in the cabin 102 of the aircraft 100. Next, a person may determine if existing paneling 214 is installed in an overhead section (e.g., an outboard overhead section 208) of the aircraft 100 (block 2004). If existing paneling 214 is installed in the overhead section 208 of the aircraft 100, the existing paneling 214 is removed (block 2006).

If there is not existing paneling 214 in the overhead section 208 of the aircraft 100, or after the existing paneling 214 is removed, a person may determine if one or more of the rails (e.g., the inboard rail 1302) needs a stiffener plate 1702 (block 2008). If one or more of the rails 1302, 1304 needs a stiffener plate 1702, fasteners 1402 coupling, for example, the inboard rail 1302 (e.g., first rail) to a dividing panel 1318 of the overhead section 208 may be removed (block 2010). An example stiffener plate 1702 is then installed adjacent the first rail 1302 using new fasteners 1704, which are longer to accommodate the stiffener plate 1702 (block 2012). The example fasteners 1704 are disposed through apertures of both the stiffener plate 1702 and the first rail 1302 to couple the stiffener plate 1702 and first rail 1302 to the dividing panel 1318.

After the stiffener plate 1702 is installed, or if the rails 1302, 1304 do not need a stiffener plate 1702, the bracket 1202 is aligned with the example rails 1302 at approximately the desired position of the cabin divider 218 by aligning apertures 1210 of the bracket 1202 with apertures 1316 of the rails 1302 (block 2014). A clamp plate 1706 is aligned with the example outboard rail (e.g., the second rail 1304) (block 2016). The bracket 1202 is attached to the example rails 1304 using fasteners 1404, the stiffener plate 1702, and the clamp plate 1706 (block 2018). In some examples, the fasteners 1402 disposed through the first edge 1204 of the bracket 1202 adjacent to the stiffener plate 1702 are also operative to couple the stiffener plate 1702 and first rail 1302 to the example dividing panel 1318.

To attach the cabin divider 218 to the bracket 1202, the cabin divider 218 is positioned along the length of the bracket 1202 in the desired position of the cabin divider 218, and apertures 1516 of protrusions 1514 of the cabin divider 218 are aligned with apertures 1230 of the flanges 1228 of the bracket 1202 (block 2020). The cabin divider 218 is attached to the example bracket 1202 using fasteners 1518 disposed through the apertures 1230 of the bracket 1202 and the apertures 1516 of the cabin divider 218 (block 2022). Cabin paneling and PSUs (e.g., ventilation panels, lighting panels, etc.) are attached to the rails 1302, 1304 of the overhead section 208 on either side of the cabin divider 218 (block 2024). The paneling 214 is operative to cover (e.g., hide, disguise) the bracket 1202 and other components (e.g., wiring, ventilation paths, etc.) of the PSUs.

From the foregoing, it will be appreciated that example methods, apparatus and articles of manufacture have been disclosed that enable installation of a bracket for a cabin divider that may be retrofitted to existing aircraft, or may be installed in new aircraft.

The example apparatus includes a bracket to be positioned between rails in a cabin of an aircraft. The example bracket described herein includes edges having first apertures to align with second apertures of each of the rails. The bracket may be positionable along a length of the rails by aligning the first apertures of the bracket with a portion of the second apertures of the rails. The example bracket also includes flanges disposed between the edges. In the illustrated examples, the flanges have respective third apertures and fourth apertures aligned to receive fasteners for hanging a device used in the cabin of the aircraft.

In some examples, the bracket may include support ribs disposed between the edges of the bracket and the flanges of the bracket. The example bracket may also include one or more cutouts disposed adjacent the ribs and/or the flanges to reduce a weight of the bracket. Additional flanges may be disposed adjacent the first flanges of the bracket. Each of the flanges of the example bracket includes corresponding apertures to receive the fasteners for hanging the device. In some examples, the additional flanges are positioned between the respective first flanges and the edges of the bracket. In the examples described herein, a distance between respective ones of the first flanges and the second flanges is less than a distance between the first flanges.

The example bracket rigidly couples the rails together to increase a load capacity of the rails. The bracket may also be operative to reduce a deflection of the rails due to the device. In some examples, the bracket may also support a moment load caused by the object hanging from the bracket, and/or a moment load placed on the object hanging from the bracket.

An example apparatus described herein may include rails positioned in an overhead section in a cabin of an aircraft. An example bracket has a length between 3 inches and 2 feet to rigidly couple the rails via corresponding apertures of the rails and the bracket. The example bracket is operative to increase a load capacity of the rails. An example cabin divider is to be coupled to flanges of the bracket. The example cabin divider hangs from the bracket in the cabin of the aircraft.

The bracket may be coupled to the rails using example clamp plates positioned on outer surfaces of the rails. In some examples, the clamp plates are coupled to the rails and the bracket via fasteners disposed through the corresponding apertures of the rails and the bracket. The example flanges of the bracket may include two sets of parallel flanges. Respective ones of the example sets of parallel flanges are to be positioned on opposing sides of respective protrusions of the cabin divider to couple the cabin divider to the bracket. The protrusions of the cabin divider include two apertures. The example protrusions of the cabin divider coupled to one of the sets of parallel flanges via fasteners disposed through the apertures of the protrusions of the cabin divider and corresponding apertures of the parallel flanges. A stiffener plate may be coupled to one of the rails. The example stiffener plate is to enable the one of the rails to be coupled to the bracket. The stiffener plate has a length approximately equal to the rails.

An example method of installing the example cabin dividers includes aligning first apertures of a bracket with apertures of rails disposed in a cabin of an aircraft, coupling the bracket to the rails using clamp plates and fasteners disposed through the first apertures and a portion of the apertures of the rails, and coupling a divider to second apertures of the bracket using fasteners disposed through second apertures of the bracket and a flange of the divider.

In some examples, the method further includes removing existing cabin paneling coupled to the rails. The method may also include aligning the clamp plates with the apertures of the rails. In some examples, the method includes positioning the divider along a length of the bracket by aligning apertures of the flange of the divider with a portion of the second apertures of the bracket. The example method may additionally include removing existing fasteners from one of the rails and attaching a stiffener plate to the one of the rails using new fasteners disposed through the apertures of the rail and corresponding apertures of the stiffener plate. In some examples, the method may include attaching cabin paneling to the rails on opposing sides of the divider.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   rails positioned in an overhead section in a cabin of an aircraft;
   a bracket rigidly coupled between the rails via first attachment points of the bracket and corresponding second attachment points of the rails, the bracket to increase a load capacity of the rails; and
   a cabin divider to be coupled to flanges of the bracket, the cabin divider to hang from the bracket in the cabin of the aircraft.

2. The apparatus of claim 1, wherein the bracket includes edges having the first attachment points to align with the second attachment points of each of the rails, the bracket positionable along a length of the rails by aligning the first attachment points of the bracket with a portion of the second attachment points of the rails.

3. The apparatus of claim 2, wherein the flanges are disposed between the edges, the flanges having respective third attachment points and fourth attachment points, the third and fourth attachment points to be aligned to receive fasteners for hanging the cabin divider in the cabin of the aircraft.

4. The apparatus as defined in claim 3 further including a cutout between the flanges of the bracket to reduce a weight of the bracket.

5. The apparatus as defined in claim 3 further including support ribs disposed between the edges of the bracket and the flanges of the bracket.

6. The apparatus as defined in claim 5 further including cutouts positioned between the support ribs.

7. The apparatus as defined in claim 3, wherein the flanges are first flanges, further including second flanges disposed adjacent the first flanges, each of the first and second flanges including corresponding attachment points to receive the fasteners for the cabin divider.

8. The apparatus as defined in claim 1 further including clamp plates to couple the bracket to the rails, the clamp plates positioned on outer surfaces of the rails.

9. The apparatus as defined in claim 8, wherein the clamp plates are coupled to the rails and the bracket via fasteners disposed through corresponding attachment points of the rails and the bracket.

10. The apparatus as defined in claim 1, wherein the flanges of the bracket include two sets of parallel flanges, respective ones of the sets of parallel flanges to be positioned on opposing sides of respective protrusions of the cabin divider to couple the cabin divider to the bracket.

11. The apparatus as defined in claim 10, wherein the protrusions of the cabin divider include two attachment points, the protrusions of the cabin divider coupled to one of the sets of parallel flanges via fasteners disposed through the attachment points of the protrusions of the cabin divider and corresponding attachment points of the parallel flanges.

12. The apparatus as defined in claim 1 further including a stiffener plate coupled to one of the rails, the stiffener plate to enable the one of the rails to be coupled to the bracket, the stiffener plate having a length approximately equal to the rails.

* * * * *